(No Model.)
F. G. DAVIS.
SPRING PLATFORM FOR VEHICLES.
No. 415,096. Patented Nov. 12, 1889.
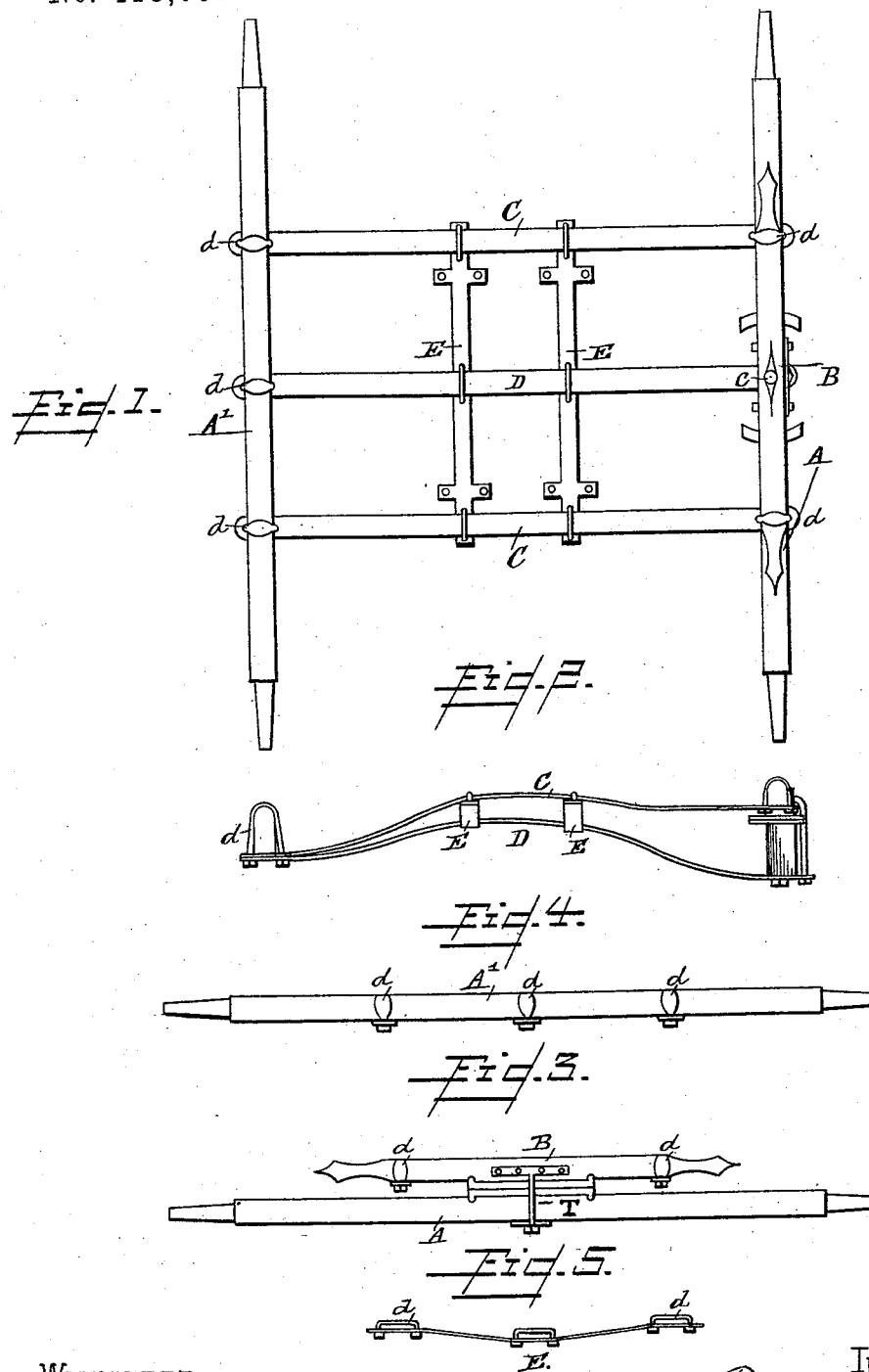
WITNESSES.
Jos H Blackwood
W. G. Doolittle
INVENTOR
Francis G. Davis
by Wm H Doolittle
ATTORNEY

UNITED STATES PATENT OFFICE.

FRANCIS G. DAVIS, OF WATERTOWN, NEW YORK.

SPRING-PLATFORM FOR VEHICLES.

SPECIFICATION forming part of Letters Patent No. 415,096, dated November 12, 1889.

Application filed August 10, 1889. Serial No. 320,351. (No model.)

*To all whom it may concern:*

Be it known that I, FRANCIS G. DAVIS, a citizen of the United States, residing at Watertown, in the county of Jefferson and State of New York, have invented certain new and useful Improvements in Spring-Platforms; and I do hereby declare the following to be a full, clear, and exact description of the invention, such as will enable others skilled in the art to which it appertains to make and use the same.

My invention relates to improvements in vehicles; and it consists of a spring-gear, as hereinafter described and claimed.

Heretofore spring-gears to support the body of road-wagons and other vehicles have been made in which the side springs and spring-perch have been connected to the rear axle and to the bolster by shackles.

The principal object of my invention is to make this connection rigid, so that an up-and-down movement of the spring-platform will not be allowed, except such as obtained from the spring-perch. The means for this purpose and additional features constitute my invention, as hereinafter described and claimed.

In the accompanying drawings, Figure 1 is a top view of the platform and connected parts; Fig. 2, a side view; Fig. 3, a front view of front axle and bolster; Fig. 4, a rear view of rear axle; and Fig. 5 a section of center showing a brace.

A A' are the front and rear axles; B, the head-block or bolster; C C, the two side springs; D, the spring-perch; E E, the connecting-braces and body-supports.

The two side springs C C are rigidly connected to the bottom of the rear axle A' and to the bolster B by means of clips $d$ or otherwise. The spring-perch D is also rigidly connected to bottom of rear axle A' by means of clips $d$ or otherwise, and is also connected to front axle A in such a manner that the front axle A will have free movement on the king-bolt $c$. In this case I make the front connection of spring-perch D with front axle A by passing the spring-perch D under axle A, and have the king-bolt go through the spring-perch, and also as a means of safety put what is called a "T-bolt" through the spring-perch D in front of the axle and bolt the T part to the bolster.

The bolster B is connected to the front axle A in the usual manner. It is obvious that other means of connecting the spring-perch D to front axle A can be used without conflicting with the principle of my invention.

The two braces E E are rigidly connected to the springs C C and spring-perch D by means of clips or otherwise. I can also use other or additional means of connecting together or bracing springs C C and spring-perch D, if necessary, and can also brace same to axle A' or bolster, if I desire. As shown, I prefer to connect the side springs rigidly to the bottom of the rear axle; but they may be so connected to the top of the rear axle without departing from my invention, and the same may be said as to their connection with the bolster. The rigid connection may be with the top instead of with the bottom thereof. By the use of shackle or similar connections there is no tendency to turn the axles, the platform springing independently thereof, while with my invention the up-and-down movement of the springs is controlled by the rigid connection with the axle, which tends to turn the axle on the same principle as the old style of buckboard, and by my improvements all rattling is prevented and a cheaper construction is obtained.

What I claim is—

1. A spring-platform consisting, in combination with front and rear axles and bolster, of the central spring-perch, said perch passing centrally under the platform rigidly connected to the bottom of the rear axle and passing under the front axle and rigidly connected to the said bolster, substantially as described.

2. The central spring-perch, in combination with the front axle, the rear axle, and the bolster, said perch rigidly connected to the bottom of the rear axle, passing centrally under the platform and under the front axle, and rigidly connected to the said bolster, and the side springs rigidly connected both to the rear axle and to the said bolster, substantially as described.

3. The combination, with the front and rear axles and bolster, of the central spring-perch, said perch passing centrally under the platform, rigidly connected to the rear axle, and passing under the front axle and rigidly connected to the said bolster, the side springs rigidly connected to the rear axle and to the bolster, and the cross-braces rigidly secured to the said perch and side springs and extending across the platform at right angles to the side springs, substantially as described.

4. The combination, with the front and rear axles and bolster, of the central spring-perch D, said perch passing centrally under the platform, rigidly connected to the rear axle, and passing under the front axle and rigidly connected to the said bolster, the king-bolt passed through the said perch, and the T-bolt also passed through the said perch in front of the axle with the T part bolted to the bolster, substantially as described.

In testimony whereof I affix my signature in presence of two witnesses.

FRANCIS G. DAVIS.

Witnesses:
J. E. FOLEY,
F. P. HAYES.